United States Patent [19]
Jackson

[11] 3,732,745
[45] May 15, 1973

[54] CAMSHAFT DRIVE CONVERTER KIT AND METHOD

[76] Inventor: Maurus E. Jackson, 4919 Argus Drive, Los Angeles, Calif. 90041

[22] Filed: Dec. 1, 1971

[21] Appl. No.: 203,648

[52] U.S. Cl. ............74/325, 123/90.15, 123/90.27, 123/90.31, 123/DIG. 6, 123/DIG. 7
[51] Int. Cl. ............F16h 3/08, F01l 1/34, F01l 1/02
[58] Field of Search ..................123/DIG. 7, DIG. 6, 123/90.31, 90.27, 90.15; 74/325

[56] References Cited

UNITED STATES PATENTS 3,415,137  10/1968  Casale .......................123/90.15 X Primary Examiner—Leonard H. Gerin
Attorney—William Douglas Sellers et al.

[57] ABSTRACT

A camshaft drive converter kit and method for converting a vehicle engine camshaft from chain to gear drive without need for machining or otherwise altering the engine structure and simply by substituting kit components for chain drive components. The kit includes several idler gears having closely related but slightly different pitch diameters and one selected pair of which gears is best suited for use to interconnect the kit crankshaft and camshaft gears. Both idler gears are held assembled floatingly between the driving and driven gears and are held against axial displacement by the cover for the camshaft drive mechanism.

13 Claims, 5 Drawing Figures

PATENTED MAY 15 1973 3,732,745

OVERSIZE  NOMINAL  UNDERSIZE

INVENTOR
MAURUS E. JACKSON
BY
ATTORNEYS

CAMSHAFT DRIVE CONVERTER KIT AND METHOD

This invention relates to engine crankshaft drive mechanisms, and more particularly to a novel kit of converter components and to a method of utilizing the same to convert a vehicle engine from chain to gear camshaft drive operation to enhance its power output and its high speed performance characteristics.

It is well known among engine designers that chain driven camshafts have serious limitations and undesirable operating characteristics, particularly higher speeds and when used for racing purposes. Numerous proposals have been made for substituting gear drives for chain drive operation. However, such prior proposals leave much to be desired and are subject to various objections and disadvantages including the excessive cost of the conversion parts, the time, skill and alteration operations required to make the conversion, the need for precision gauges and machining operations and other similar requirements not readily found outside of a specially equipped garage or machine shop. Various expedients have been proposed for supporting an idler gear with the requisite precision and rigidity. Any misalignment or error in the location of the idler axis causes premature failure of the new drive and unacceptable engine performance. Conversion expedients previously suggested normally necessitate removal of the engine from the vehicle. If any error is made in altering the engine to accommodate the new parts, it is usually impossible or impractical to make repairs meeting the exacting requirements imposed on a racing engine.

My copending application for United States Letters Patent Ser. No. 142,495, filed May 12, 1971, discloses a simple, inexpensive, readily installed converter assembly avoiding the many shortcomings and disadvantages of prior conversion units. The idler gears of that construction are mounted at the opposite ends at a pair of side links and are insertable endwise of and between a new pair of camshaft and crankshaft gears. However, it has been found that superior results are obtainable under certain conditions by eliminating the side links and relying entirely upon the interlocking action of the intermeshed teeth of the idler gears with the cam and crankshaft gears to hold the gears in mesh. Both of the idler gears are free to float independently of one another between the driving and driven gear with one only of the idlers in positive driving contact at any one time depending upon whether the engine is operating or whether it is being rotated by pushing the vehicle backward. In either case one of the two idlers is held captive but rotates loosely and free of load whereas, the other automatically shifts into a precision, load transmitting position with both the crank and camshaft gears.

A feature of the present kit is the provision of a plurality of idler gears differing from one another by a few mils as respects their pitch diameters thereby enabling the installer to select the particular pair of idlers best suited to interconnect the crank and camshaft gears in a particular engine.

Accordingly, it is a primary object of the present invention to provide a kit of gear components for converting a chain driven engine camshaft to gear drive.

Another object of the invention is the provision of an improved set of gears and a method for converting an engine originally built with chain camshaft gear to gear drive.

Another object of the invention is the provision of simple, precision parts designed for installation in a stock vehicle engine without need for alteration of any engine part to convert the same from chain to gear driven camshaft operation.

Another object of the invention is the provision of a gear drive camshaft kit having a plurality of idler gears of slightly differing pitch diameters selectively installable as necessary to provide the best driving fit on a particular engine.

Another object of the invention is the provision of substitute camshaft drive components for a vehicle engine utilizing at least one floating idler gear interconnecting the crankshaft and camshaft gears and totally free of connection to any other engine component and which automatically shifts into a precise operating position as an incident to starting the engine.

Another object of the invention is the provision of substitute camshaft drive components utilizing a pair of similarly pitched idler gears to interconnect the crankshaft and camshaft gears each independently and floatingly supported solely by the crank and camshaft gears and designed to move automatically into proper operating position whether the car is pushed or propelled by the engine.

These and other more specific objects will appear upon reading the following specification and claims and upon considering in connection therewith the attached drawing to which they relate.

Referring now to the drawing in which a preferred embodiment of the invention is illustrated:

Figure 1:
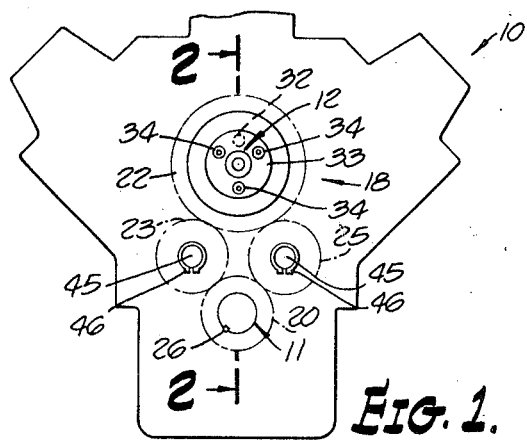
FIG. 1 is a diagrammatic view of the front end of an engine showing the position of the invention gear drive part.

Referring more particularly initially to FIG. 1, there is shown, somewhat diagrammatically, a typical 8-cylinder auto engine 10 having a crankshaft 11 and a camshaft 12 projecting from the forward end of the engine block. Typically, engines of this type are equipped with sprockets on the forward ends of the crank and camshafts interconnected by a link chain driving the camshaft clockwise and normally enclosed by a removable cover plate 13 bolted to the front end of the engine block.

The invention conversion kit, designated generally 18, includes as its principal components a crankshaft drive gear 20, a driven camshaft gear 22, and at least three timing eccentrics provided with the kit of components and held assembled in a particular position over the end of shaft 12 by a dowel pin 32, seated in a bore in the end of the camshaft, all as is well known by engine mechanics. Gear 22 is then held clamped over eccentric 30 by a retaining washer 33 held in assembled position by cap screws 34. As is well known to those familiar with the construction of internal combustion engines, the use of a particular eccentric changes the relative position of the cam gear on the camshaft and alters the point in the engine cycle at which the valves open and close.

After the cap screws 34 have been tightened a first bearing assembly is seated in the central opening of retainer washer 33. This bearing comprises a stub shaft 36, a pair of hardened rings 37,38 and a needle bearing assembly 39. This assembly bears against the end of the camshaft with its outer end closely spaced from the interior surface of the cam drive cover plate 13.

If additional backup for the thrust bearing assembly just described is desired, a wedge block indicated in dot and dash line at 40 is pressed into position between the exterior of cover plate 13 and a portion of the vehicle frame, such as that indicated at 42.

Figure 2:
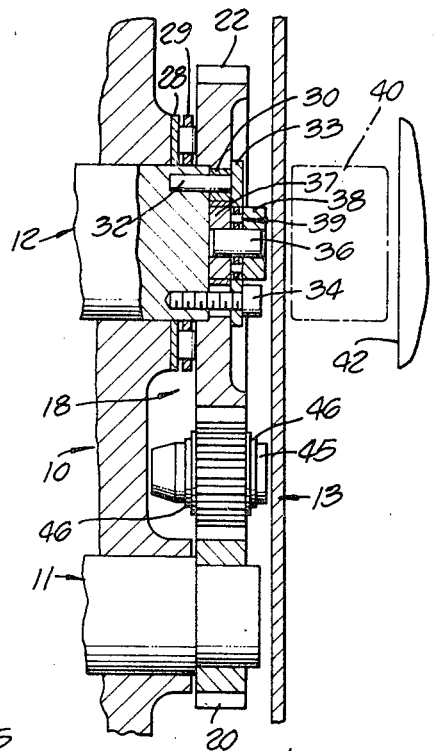
FIG. 2 is a fragmentary cross sectional view on an enlarged scale taken along line 2—2 on FIG. 1.
Figure 3:
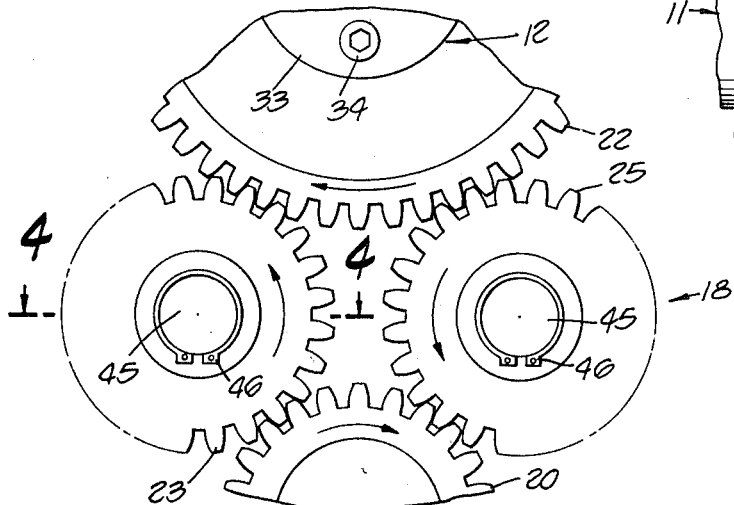
FIG. 3 is a fragmentary front elevational view of the gear drive components when stalled.
Figure 5:
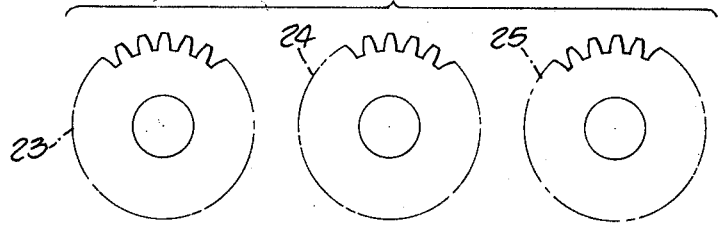
FIG. 5 is a front elevational view of a typical series of idler gears included in the converter kit.
Figure 4:
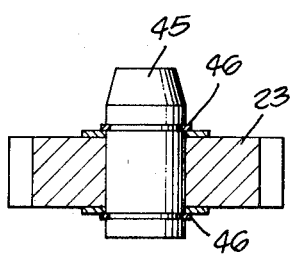
FIG. 4 is a cross sectional view taken along line 4—4 on FIG. 3.

Referring to FIG. 3, it is pointed out that, following the assembly of gears 20 and 22, a pair of idler gears is inserted between the gears 20 and 22. It will be understood that the pitch diameters of the several converter idler gears differ slightly to either side of nominal gear 24, gear 23 being slightly oversize and gear 25 being slightly undersize, such as by a difference in pitch diameters of 8 to 10 mils. The kit includes a pair of identical idler gear spacing shafts 45 held assembled to a selected pair of idlers as by split ring keepers 46,46. The inner bevelled end of shafts 45 terminate in closely spaced relation to the end wall of the engine block, as is best shown in FIG. 2 whereas, the outer end is similarly spaced from the interior surface of cover 13. It will be understood that the principal purpose of these shafts is to maintain the idlers in a common operating plane with gears 20 and 22 while leaving the idlers free to float to a limited degree in this plane.

The selection of the most appropriate pair of idlers for use between gears 20,22 is determined by trial and error, the object being to determine which particular pair of gears provides optimum operation. In this connection it is important that the proper one of the gears be selected for use on the left hand side of a vertical plane coincident with the axes of shafts 11,12. This is determined by finding which idler gear has its pitch diameter best mating with the pitch diameters of gears 20,22 with the engine rotating. When the engine is not operating gear 23 usually shifts slightly bodily to the left so as to be held loosely captive and in mesh with gears 20,22. However the moment the engine starts to rotate in its normal operating direction, gear 23 automatically shifts if necessary to its most efficient positive driving relationship in which its pitch diameter mates accurately with the respective pitch diameters of gears 20,22. Likewise under these conditions it is preferable that the second idler 25 be held loosely captive and to float or shift bodily slightly to the right as viewed in FIG. 3. In this condition, it simply rotated idly under no load since all load is carried by idler 23.

When the gears are used on racing vehicles it is usually necessary, for lack of non-essential auxiliaries, to push the vehicle backwards to rotate the crankshaft counterclockwise to expel any fuel which may have entered the cylinders while the engine is idle. Under these conditions, the engine is driven from the vehicle traction wheels and, in this event, the idler gear located to the right of a vertical plane through the engine crankshaft is employed to drive the camshaft. Accordingly, this normally inactive gear now operates under load and automatically shifts to the left slightly as the left hand idler shift to the left and simply floats loosely but captively between gears 20,22.

The presence of idler gear 25 serves an important function on stopping the engine. At this time hot gases present in one or more of the cylinders not infrequently cause the engine to rotate backwards, i.e., counterclockwise. This counter rotation could be sufficient to eject power idler 23 from meshing engagement with gears 20 and 22 were it not for the synchronizing action of idler 25 on gears 20 and 22.

As herein shown and described, the idler gears have the same number of teeth as crank gear 20. However, a slightly different size idler gear with a slightly smaller or larger number of teeth may be employed in which case the number of teeth on cam gear 22 is always double the number of teeth on gear 20 as necessary to drive the camshaft at one half the speed of the crankshaft.

While the particular camshaft drive converter kit and method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A kit of components for use in converting a standard make internal combustion engine from chain to gear driven chamshaft operation, said kit comprising: substitute camshaft and crankshaft gears, means for securing each of said gears to a respective engine shaft, an idler gear for use in lieu of the original chain drive, said idler gear having substantially the same pitch diameter as said substitute crankshaft gear and adapted to be held floatingly and positively in mesh with the teeth of said two substitute gears independently of the shaft for said crankshaft and camshaft gears when assembled axially of said gears in an area offset laterally closely beside a plane coincident with the axes of the engine crank and camshafts, and said idler gear having axial projections on the opposite faces thereof with their outer ends adapted to lie respectively closely spaced from the engine body and from the interior surface of a cover for the camshaft drive mechanism.

2. A kit as defined in claim 1 characterized in the provision of a pair of said idler gears adapted to be assembled between said crank and camshaft gears on the opposite sides of said plane coincident with the axes of said crank and camshafts and one of which operates in an idling condition when the engine is operating and the other of which operates in an idling condition when the engine is being rotated reversely from an extended power source.

3. A kit as defined in claim 1 characterized in the provision of a plurality of said idler gears having pitch diameters differing from one another by a few mils optionally installable on an engine between said crank and camshaft gears depending on which idler gear provides the best fit and gear drive on the particular engine on which said kit components are installed.

4. A kit as defined in claim 2 characterized in the provision of at least three of said idler gears having pitch diameters differing from one another by a few mils and any two of which are optionally installable on a particular engine between said cam and crankshaft gears depending on which two provide optimum operating characteristics on that engine.

5. A kit as defined in claim 1 characterized in that said projections on the opposite faces of said idler gear are formed on the opposite ends of a shaft provided with means for holding the same assembled in a central through bore in said idler gear.

6. A kit as defined in claim 5 characterized in that said shaft projects unequally from the opposite faces of said idler gear.

7. A kit as defined in claim 1 characterized in the provision therein of thrust bearing means insertable over the end of the engine camshaft before said substitute cam gear is secured thereto.

8. That method of converting an internal combustion engine camshaft from chain to gear drive utilizing simple kit components which method comprises: removing the existing drive components interconnecting an engine crank and camshaft, installing a cam drive gear on the camshaft, installing a drive gear on the shaft, inserting a first floating idler gear axially of said cam and crank gears in an area offset slightly to one side of a plane coincident with the engine cam and crankshafts and having a pitch diameter substantially corresponding to the pitch diameter of said crankshaft gear, and providing the opposed faces of said idler gear with axial projections having their remote outer ends respectively closely spaced from juxtaposed portions of the engine body and of a cover for camshaft gear drive.

9. That method defined in claim 8 characterized in the step of installing said floating idler gear on the side of said crank and camshaft gears required for the operation of said engine.

10. That method defined in claim 9 characterized in the step of installing a second floating idler gear similar to the first idler gear between said crank and camshaft gears but on the opposite side of said plane and normally operating under no load conditions when said engine is operating and operable to drive said camshaft.

11. That improvement in a machine having two parallel gear-equipped shafts, first and second shaftless idler gears structurally disassociated with one another floatingly in mesh with each of said first mentioned gears in areas disposed on the opposite sides of a plane common to the axes of said shafts whereby said gears mutually cooperate in holding said first and second idler gears in assembled position irrespective of which of said shafts is the driving shaft and irrespective of its direction of rotation.

12. That improvement defined in claim 11 characterized in that one of said idler gears has more teeth than the other.

13. That improvement defined in claim 11 characterized in that all of said gears are free of radial flanges along both axial ends of the teeth thereof.

* * * * *